H. B. GUE & H. R. ROBERTS.
AIR SHUTTER FOR AUTOMOBILE RADIATORS.
APPLICATION FILED JUNE 1, 1915.
1,181,873.
Patented May 2, 1916.
2 SHEETS—SHEET 1.
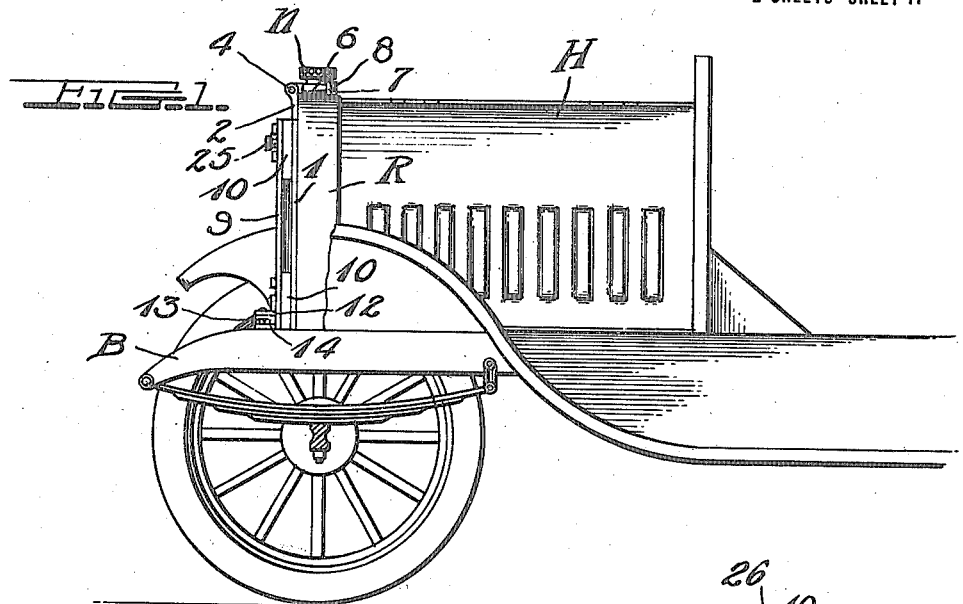
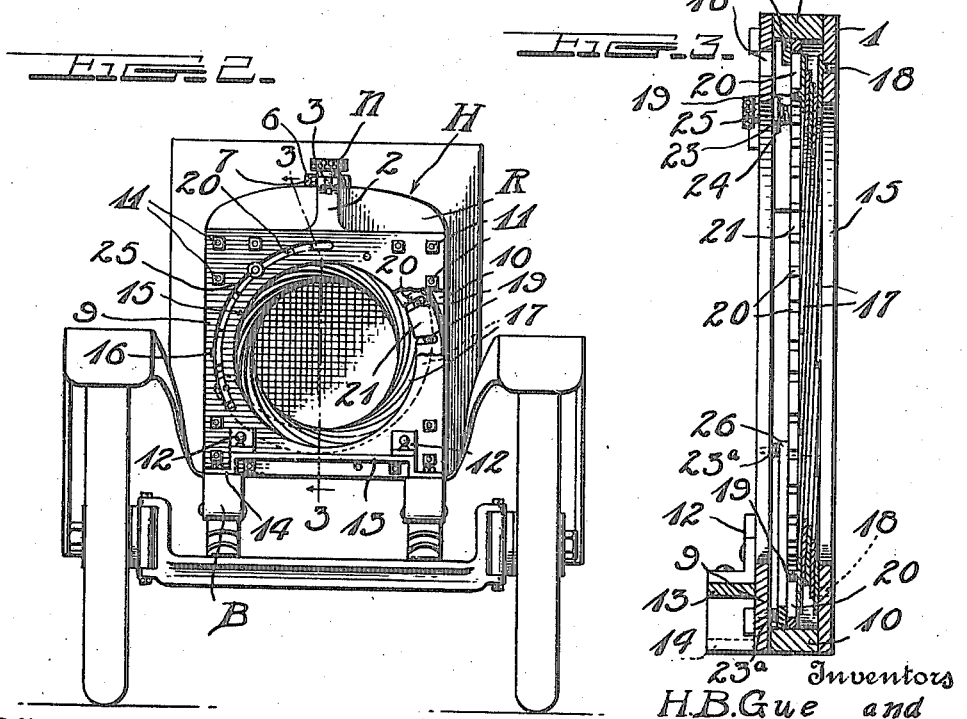
Inventors
H. B. Gue and
H. R. Roberts
Attorneys

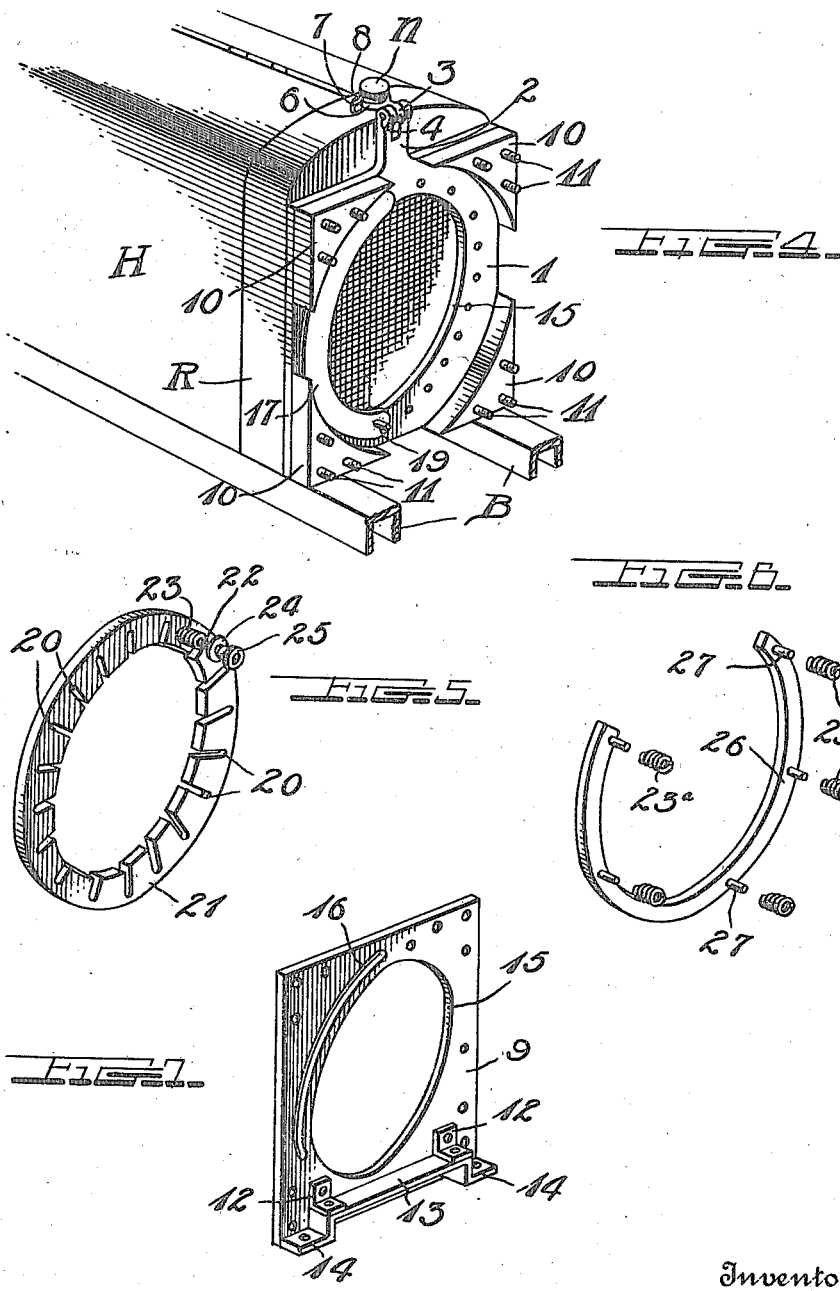

UNITED STATES PATENT OFFICE.

HARVEY B. GUE AND HARRY R. ROBERTS, OF SHERIDAN, WYOMING.

AIR-SHUTTLE FOR AUTOMOBILE-RADIATORS.

1,181,873.  Specification of Letters Patent.  Patented May 2, 1916.

Application filed June 1, 1915. Serial No. 31,560.

*To all whom it may concern:*

Be it known that we, HARVEY B. GUE and HARRY R. ROBERTS, citizens of the United States, residing at Sheridan, in the county of Sheridan and State of Wyoming, have invented certain new and useful Improvements in Air-Shutters for Automobile-Radiators; and we do declare the following to be a full, clear, and exact description of the invention, such as will enable others skilled in the art to which it appertains to make and use the same.

Our invention relates broadly to improvements in automatic accessories and more particularly to a shutter for attachment to automobile radiators for varying the amount of air passing through the same and thus controlling the temperature of the water cooled by such radiators, as well as the temperature of the motor.

The object of the invention is to provide a device of this class which although being of very simple and comparatively inexpensive construction, will be highly efficient in operation and will possess a number of advantageous features.

With this object in view, the invention resides in certain novel features of construction and in unique combinations of parts hereinafter described and claimed.

In describing the invention, we shall refer to the accompanying drawings wherein like reference characters designate corresponding parts throughout the several views and wherein:

Figure 1 is a side elevation of a portion of an automobile showing the application of the invention to the radiator thereof; Fig. 2 is a front elevation of the shutter and the radiator to which the same is applied; Fig. 3 is a vertical section taken along the plane indicated by the line 3—3 of Fig. 2; Fig. 4 is a perspective view of the rear attaching plate to be described; Fig. 5 is a perspective of the shutter actuating ring; Fig. 6 is a similar view of the brake ring, and Fig. 7 is yet another perspective showing the construction of the front attaching plate and the attaching bar secured thereto.

In these drawings which constitute a part of the application, B designates the longitudinally disposed side bars of an automobile chassis; H represents the hood rising from the front ends of these bars, and R designates the usual radiator disposed in advance of the hood and through which air is allowed to pass for the purpose of cooling the water circulating from the engine jacket through said radiator. It is well known that in particularly cold weather, it is essential to admit only a small amount of air into the hood through the radiator, since otherwise the engine becomes chilled and will not operate to advantage. This is particularly true, when the machine is left standing with the motor idle for a considerable length of time, it being then a very difficult matter to crank the engine when starting the same. Numerous devices have been applied to use for preventing the entrance of too much cold air into the hood and for entirely closing the front of the radiator against the entrance of such air when necessary. Some of these devices have proved to be rather efficient, while others have never come into practical use on account of the fact that the desired ends cannot be attained thereby. It is therefore our intention by the present invention to overcome the difficulties heretofore encountered and to thus provide a shutter which will possess a number of highly advantageous features although being of very simple and inexpensive construction. To this end, the construction shown in conjunction with the radiator R is provided.

Disposed in contact with the front side of the radiator, is a rear rectangular attaching plate 1 which terminates a slight distance above the openwork of said radiator and which rests upon the bar B previously described. Either secured to or formed integrally with the upper edge of the plate 1, is an ear 2 which is preferably notched and receives in its notch a bearing 3 through which and through the ear a bolt of the like 4 is passed. The bearing 3 is shown in the present application as formed integrally with a fork 6 straddling the filling nipple N of the radiator R, a clamping plate 7 being forced into contact with the rear side of said nipple by nuts 8 threaded on the ends of the fork 6. By the detail of construction just described, it will be evident that the plate 1 may be secured to practically any type of automobile, provided the clamp and parts associated therewith be constructed of proper proportions.

Spaced an appropriate distance in advance of the rear attaching plate 1 is the front attaching plate 9, the two plates being spaced by substantially triangular plates 10 interposed between the four corners thereof, bolts of the like 11 being then passed through said corners and through the plates 10 therebetween. The lower corners of the front attaching plates 9 are provided with angle iron brackets or the like 12 resting on and secured to an attaching bar 13 whose ends are bent downwardly and then extended laterally to provide feet 14 resting on and bolted or otherwise secured to the bars B. It will be evident that such additional means of attaching the invention to an automobile may be likewise applied to use in connection with practically any make of machine.

As clearly disclosed in Figs. 4 and 7, the rear plate 1 and the front plate 9 are provided with circular openings 15 whereby they become in effect rings, and in addition to the openings 15, the front plate 9 is provided with an arcuate slot 16 disposed concentric with the surrounding wall of its opening 15.

The front and rear plates previously described and the spacing plates 10 at the corners thereof constitute a rectangular casing within which the shutter and the actuating means therefor are disposed, said shutter being in the form of a plurality of overlapping substantially semi-circular plates 17 whose inner and outer edges normally lie substantially concentric with the edges of the openings 15, the several plates 17 being provided at one end with studs 18 which project removably into an annular series of openings with which the rear attaching plate 1 is provided. The opposite ends of said plates, however, are provided with forwardly extending studs 19 which are received by radially disposed slots 20 opening through the inner edge of a flat shutter actuating ring 21. Thus it will be evident that when the ring is rotated in the proper direction, the several overlapping plates 17 will be rocked around the studs 18 to bring their inner edges toward the center of the openings 15 as disclosed in Fig. 2, whereas movement of said ring in the opposite direction will again dispose the several plates 17 adjacent the edges of said openings. For so actuating the ring 21, the same is provided with a forwardly projecting handle 22 having on its rear portion a coiled spring 23 normally forcing a washer 24 forwardly, the front end of said handle being projected through the slot 16 and equipped with any preferred type of knob 25, said knob being preferably in the form of a nut.

The spring 23 serves to force a portion of the ring 21 toward the rear plate 1, thus frictionally binding the several arcuate shutter plates 17 between these parts and not only preventing rattling, but retaining such plates in their adjusted position. It will be evident, however, that the spring in question does not exert its tension throughout the circumference of the ring 21, it being therefore expedient to provide additional spring pressed anti-rattling and brake means for frictionally retaining the remaining of the plates 17 in adjusted positions and for preventing rattling of the several parts. To this end, a split brake ring 26 is provided, said ring being disposed in contact with the front side of the shutter actuating ring 21 throughout the greater part of the circumference thereof, although the ends of said ring terminate at points disposed adjacent the ends of the slots 16, thus allowing the proper amount of movement on the part of the handle 24 and thereby allowing the ring 21 to have such movement, during which the spring 23 actuates in the manner above set forth, while additional springs 23$^a$ which are interposed between the front plate 9 and the brake ring 26 exert their tension to force said ring rearwardly against the ring 21, thus exerting a braking action thereon as well as forcing the same into such forcible contact with the plates 17 as to positively prevent rattling thereof.

In order to lock the brake ring 26 against rotation with the ring 21 and thereby prevent cramping of the springs 23$^a$, said brake ring is provided with a plurality of forwardly extending pins 27 which project through the springs 23$^a$ and through openings in the front plate 9, it being thus evident that in addition to the other advantages derived by the use of the pins 27, they retain the springs 23$^a$ in their relative positions.

By the provision of the brake ring and the springs 23$^a$ forcing the same toward the ring 21, thereby shifting this ring toward the plates 17, and by the provision of the spring 23 which likewise shifts the ring 21 toward the plates 17, the frictional contact existing between the contacting parts is equalized, thereby producing the desirable results above set forth.

When the invention is applied to use, it is simply necessary to shift the knob 25 in one direction or the other in respect to the slot 16, to bring the inner edges of the several plates 17 toward each other, thereby forming a comparatively small opening at the center of the device, or to cause said edges to recede from each other to increase the size of the opening. After such adjustment has been made to accurately control the temperature within the hood H, the brake ring 26 and the springs 23 and 23$^a$ coöperate to prevent shifting and rattling of the several movable parts of the shutter as the machine is being driven.

From the foregoing description, taken in connection with the accompanying drawings, it will be evident that although comparatively simple construction has been provided for the attainment of the desired end, the invention will be extremely efficient in operation.

In the aforesaid drawings, certain specific details of construction are shown for accomplishing probably the best results, and in the preceding such details have been described, but it will be evident that we need not be limited thereto otherwise than to the extent to which the appended claims limit us.

We claim:

1. In a shutter, the combination with a fixed plate having an opening, a plurality of arcuate shutter plates pivoted at one end at points spaced around said opening, and a shutter actuating ring having pivotal and radially slidable connections with the other ends of said plates; of spring means forcing the actuating ring toward the shutter plates.

2. In a shutter, the combination with a fixed plate having an opening, a plurality of arcuate shutter plates pivoted at one end at points spaced around said opening, and a shutter actuating ring having pivotal and radially slidable connections with the other ends of said plates; of a brake ring disposed in contact with said actuating ring and held against movement in respect thereto, and spring means forcing the brake ring toward the actuating ring.

3. In a shutter, the combination with a fixed plate having an opening, a plurality of arcuate shutter plates pivoted at one end at points spaced around said opening, and a shutter actuating ring having pivotal and radially slidable connections with the other ends of said plates; of a brake ring disposed in contact with the side of the arcuate plates remote from the fixed plate, pins projecting laterally from said brake ring, an additional fixed plate having openings through which said pins project, and springs disposed on the pins and interposed between the brake ring and the additional fixed plate.

4. In combination, a fixed plate having an opening, a plurality of arcuate overlapped shutter plates pivoted at one end to said plate at points disposed around the opening thereon, a shutter actuating ring disposed in contact with the sides of the shutter plates remote from the fixed plate, pivotal and radially slidable connections between the other ends of said shutter plates and the shutter actuating ring, a handle projecting from said actuating ring away from the fixed plate, a split brake ring disposed in contact with the side of the shutter actuating ring remote from the shutter plates, pins projecting from said brake ring in the direction of the handle, an additional fixed plate having openings receiving said pins and an arcuate slot through which the handle projects, a coiled spring surrounding the handle and interposed between the additional plate and the shutter actuating ring, and additional coiled springs surrounding the aforesaid pins and interposed between the brake ring and said additional fixed plate.

In testimony whereof we have hereunto set our hands in presence of two subscribing witnesses.

HARVEY B. GUE.
HARRY R. ROBERTS.

Witnesses:
H. GLENN KINSLEY,
ARTHUR H. ROUSH.